(12) United States Patent
Lv

(10) Patent No.: US 8,776,085 B2
(45) Date of Patent: Jul. 8, 2014

(54) COMMON MESSAGE HEADER BEARING METHOD AND APPARATU FOR CONVERTING SOAP API INTO REST API

(71) Applicant: Huawei Technologies Co., Ltd., Shenzhen (CN)

(72) Inventor: Juntao Lv, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/826,405

(22) Filed: Mar. 14, 2013

(65) Prior Publication Data

US 2013/0205305 A1 Aug. 8, 2013

Related U.S. Application Data

(63) Continuation of application No. PCT/CN2011/074949, filed on May 31, 2011.

(30) Foreign Application Priority Data

Oct. 20, 2010 (CN) .......................... 2010 1 0516295

(51) Int. Cl.
*G06F 3/00* (2006.01)
(52) U.S. Cl.
USPC .......................................... 719/313; 719/328
(58) Field of Classification Search
None
See application file for complete search history.

(56) References Cited

U.S. PATENT DOCUMENTS

| | | | |
|---|---|---|---|
| 2008/0140861 A1 | 6/2008 | Kothari et al. | |
| 2009/0327868 A1* | 12/2009 | Tsukikawa | 715/239 |
| 2010/0083287 A1* | 4/2010 | Maximilien et al. | 719/328 |
| 2010/0293555 A1* | 11/2010 | Vepsalainen | 719/313 |
| 2012/0173679 A1* | 7/2012 | Li | 709/220 |

FOREIGN PATENT DOCUMENTS

| | | |
|---|---|---|
| CN | 101699914 A | 4/2010 |
| JP | 2004152145 A | 5/2004 |
| JP | 2010165250 A | 7/2010 |

OTHER PUBLICATIONS

"A Speech Mashup Framework for Multimodal Mobile Services", Fabbrizio, 2009, pp. 1-8.*
"REST: Representational State Transfer", Chapter 11, 2005, pp. 1-25.*
International Search Report issued in corresponding PCT Patent Application No. PCT/CN2011/074949, mailed Sep. 8, 2011.
Office Action issued in corresponding Chinese Patent Application No. 201010516295.X, mailed Oct. 10, 2012.

* cited by examiner

*Primary Examiner* — Tuan Dao
(74) *Attorney, Agent, or Firm* — Brinks Gilson & Lione

(57) ABSTRACT

A common message header bearer method for converting a SOAP API into a REST API includes: determining a REST API common message bearing field, where the common message bearing field is a field in a REST API message header and complies with a following format: one header field name+one header field value+multiple attribute-value pairs (10); and bearing a relevant content of a SOAP message header in the common message bearing field in a format of the attribute-value pairs (11). Embodiments of the present disclosure further provide an apparatus for converting a SOAP API into a REST API.

15 Claims, 2 Drawing Sheets

COMMON MESSAGE HEADER BEARING METHOD AND APPARATU FOR CONVERTING SOAP API INTO REST API

CROSS-REFERENCE TO RELATED APPLICATIONS

This application is a continuation of International Application No. PCT/CN2011/074949, filed on May 31, 2011, which claims priority to Chinese Patent Application No. 201010516295.X, filed on Oct. 20, 2010, both of which are hereby incorporated by reference in their entireties.

FIELD OF TECHNOLOGY

The present disclosure relates to the field of communication technologies, and in particular, to a common message header bearer method and apparatus for converting a SOAP API into a REST API.

BACKGROUND

A Simple Object Access Protocol Application Programming Interface (SOAP API, Simple Object Access Protocol Application Programming Interface) is an interface for implementing interconnection and interworking between application software systems based on a Web service mechanism. The SOAP API allows application software developed by using different operating systems and different languages to easily implement interworking. A complete SOAP API message includes a message header (header bearer) and a message body (body bearer). The message header is used to bear common information for common processing such as authorization. The message body is used to bear service-related information for service-related processing.

A Representational State Transfer Application Programming Interface (REST API, Representational State Transfer Application Programming Interface) is a common interoperable interface between Internet-based WEB application capabilities, that is, an API complying with the REST style. A system corresponding to the API complying with the REST style is a REST-style system. Features of the REST-style system include the followings: externally open information is a resource, where the resource is identified by a Uniform Resource Identifier (URI, Uniform Resource Identifier) of conventional WEB technologies; only four operations are allowed for the externally open resource, including add, modify, delete, and get, which respectively correspond to Post (add), Put (modify), Delete (delete) and Get (get) in the Hyper text Transfer Protocol (HTTP, Hyper Text Transfer Protocol) of conventional WEB technologies.

With the fast development of the Internet, it is expected that all capabilities may be open to the Internet. For example, a conventional application system using Web services starts to open to the Internet. Therefore, it is necessary to open the SOAP API as a corresponding REST API (that is, convert the SOAP API into the REST API). When the SOAP API is opened as the corresponding REST API, contents of the service part will be abstracted into resources, and the SOAP common message header part requires a common bearer point in the new REST API interface. Because WEB technologies use the HTTP protocol, HTTP message headers of the HTTP protocol of WEB applications mainly bear fields related to negotiation between HTTP protocol clients and servers, and HTTP message bodies mainly bear service messages. As a result, when the SOAP API is converted into the REST API, it is necessary to find an appropriate position in HTTP to carry the relevant content of a SOAP message header.

A prior art 1 provides a solution for converting the SOAP API into the REST API, which is extending HTTP message header fields by adding contents which are to be carried by SOAP header and prefixed with X, as follows:

POST
http://www.example.com/sms/1.0/smsmessaging/outbound/100860001/requests HTTP/1.1
    Authorization: Basic QWxhZGRpbjpvcGVuIHNlc2FtZQ==
    Accept: application/xml
    Content-Type: application/xml; charset=UTF-8
    Host: example.com:80
    X-Partner-Id:3500001
    X-Service-Id:35000010001

This extension results in too many header field names in HTTP protocol fields, which is confusing. In addition, the extension of HTTP protocol fields is normally related to a bottom-layer negotiation mechanism between HTTP protocol clients and servers, and this extension reduces the processing speed of bottom-layer negotiation between the clients and the servers.

A prior art 2 provides a solution for converting the SOAP API into the REST API, which is carrying a SOAP message header in an HTTP message body.

However, because an HTTP message body mainly bears service messages, the inclusion of message header contents in an XML file of every service message results in strong association between service messages and message headers, and weak independence in file and program processing. In addition, during program processing, the whole service message body must be parsed to complete authorization required by the message header, which results in a low processing speed.

As a result, the prior arts for converting the SOAP API into the REST API have the problem of redundancy and slow message processing.

SUMMARY

Embodiments of the present disclosure provide a common message header bearer method and apparatus for converting a SOAP API into a REST API.

Embodiments of the present disclosure are implemented by using the following solutions.

Embodiments of the present disclosure provide a common message header bearer method for converting a Simple Object Access Protocol Application Programming Interface SOAP API into a Representational State Transfer Application Programming Interface REST API, including:

determining a REST API common message bearing field, where the common message bearing field is a field in a REST API message header and complies with a following format: one header field name+one header field value+multiple attribute-value pairs; and bearing a relevant content of a SOAP message header in the common message bearing field in a format of the attribute-value pairs.

Embodiments of the present disclosure provide an apparatus for converting a Simple Object Access Protocol Application Programming Interface SOAP API into a Representational State Transfer Application Programming Interface REST API, including:

a determining unit configured to determine a REST API common message bearing field, where the common message bearing field is a field complying with a following format: one header field name+one header field value+multiple attribute-value pairs; and a converting unit configured to bear a relevant content of a SOAP message header in the common message bearing field in a format of the attribute-value pairs.

According to the solutions provided by embodiments of the present disclosure, the relevant content of a SOAP message header is borne in a REST API common message bearing field, and the common message bearing field is located in a REST API message header. Thereby, the embodiments of the present disclosure prevent problems such as strong association between a service message and a message header and the necessity of parsing the whole service message body to complete authorization required by the message header during program processing which results in a low processing speed. In addition, because the common message bearing field is a field complying with a format of one header field name+one header field value+multiple attribute-value pairs, a problem of slow bottom-layer negotiation between a client and a server due to too many header field names may be effectively prevented.

Therefore, the common message header bearer solutions provided by the embodiments of the present disclosure for converting a SOAP API into a REST API ensure system simplicity and good protocol parsing performance.

DETAILED DESCRIPTION

The solutions in the embodiments of the present disclosure are hereinafter described clearly and completely with reference to the accompanying drawings in the embodiments of the present disclosure. It may be understood that the described embodiments are only a part rather than all of the embodiments of the present disclosure. Based on the embodiments of the present disclosure, all other embodiments obtained by persons of ordinary skill in the art without creative efforts shall fall within the protection scope of the present disclosure.

Figure 1:
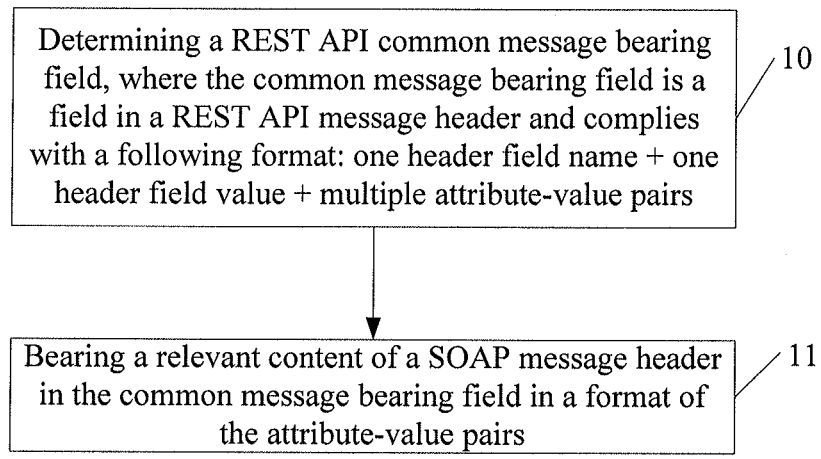
FIG. 1 is a flowchart of a common message header bearer method for converting a SOAP API into a REST API according to an embodiment of the present disclosure.

An embodiment of the present disclosure provides a common message header bearer method for converting a SOAP API into a REST API. As shown in FIG. 1, the method includes the following steps.

Step 10: Determine a REST API common message bearing field, where the common message bearing field is a field in a REST API message header and complies with a following format: one header field name+one header field value+multiple attribute-value pairs.

The common message bearing field may be an existing field in the HTTP protocol, such as an authorization (Authorization) field, or a newly created field in the REST API. Either the existing field or the newly created field meets a format of one header field name+one header field value+multiple attribute-value pairs, thereby effectively preventing a problem of slow bottom-layer negotiation between a client and a server resulting from too many header field names.

The attribute-value pair includes an attribute name+an attribute value.

Embodiments of the present disclosure set no limit on the number of the attribute-value pairs, which may be two or more.

Step 11: Bear a relevant content of a SOAP message header in the common message bearing field in a format of the attribute-value pairs.

The content of the SOAP message header to be borne in the common message bearing field varies depending on application systems for interworking, and the embodiment of the present disclosure sets no limit thereto.

Embodiments of the present disclosure provide a simple and convenient common message header bearer solution for converting a SOAP API into a REST API. Because the relevant content of a SOAP message header is borne in a REST API common message bearing field, and the common message bearing field is located in a REST API message header, the following problems are prevented: problems such as strong association between a service message and a message header and the necessity of parsing the whole service message body to complete authorization required by the message header during program processing which results in a low processing speed. In addition, because the common message bearing field is a field complying with a format of one header field name+one header field value+multiple attribute-value pairs, a problem of slow bottom-layer negotiation between a client and a server due to too many header field names may be effectively prevented.

Therefore, the method provided by embodiments of the present disclosure for converting a SOAP API into a REST API ensures system simplicity and good protocol parsing performance.

An example provided by an embodiment of the present disclosure for converting a SOAP API into a REST API is as follows.

The "Authorization" field of the HTTP protocol message header is extended as an example. By studying the Authorization field, it is found that Authorization in the HTTP protocol is allowed to be extended to different authorization modes. For different authorization modes, message attribute values that are carried may be randomly extended. In the example of converting a SOAP API into a REST API, an extended protocol is as follows, where the underlined part is the extended content. The extended field is the "Authorization" field in the HTTP protocol message header bearing negotiation-related fields. The extended "Authorization" field contains a header field name Authorization, a header field value EXAMPLEAUTH realm="EXAMPLE", and multiple attribute-value pairs made up of attributes names+attribute values such as devId="3500001", authType="01",
    authValue="QWxhZGRpbj pvcGVuIHN1c2FtZQ==",
    timeStamp="0415011502",
    appId="350000100020003",
    SAN="100860001",
    OA="13912345678",
    FA="13912345678",
    multicastMessaging="false":

The extended HTTP protocol in this embodiment is as follows:

```
POST
http://www.example.com/sms/1.0/smsmessaging/outbound/100860001/
requests HTTP/1.1
    Accept: application/xml
    Content-Type: application/xml; charset=UTF-8
    Host: example.com:80
    Authorization: EXAMPLEAUTH realm="EXAMPLE",
    devId="3500001",
    authType="01",
    authValue="QWxhZGRpbjpvcGVuIHNlc2FtZQ==",
    timeStamp="0415011502",
    appId="350000100020003",
    SAN="100860001",
    OA="13912345678",
    FA="13912345678",
    multicastMessaging="false",
    <?xml version="1.0" encoding="UTF-8"?>
    <sms:outboundSMSMessageRequest
    xmlns:sms="urn:oma:xml:rest:sms:1">
        <address>tel:+1350000001</address>
        <address>tel:+1350000999</address>
        <senderAddress>tel:+1351111999</senderAddress>
        <senderName >senderName</senderName>
            <receiptRequest>
<notifyURL>http://application.example.com/notifications/
DeliveryInfoNotification</notifyURL>
        </receiptRequest>
        <outboundSMSTextMessage>
            <message> Text Message </message>
        </outboundSMSTextMessage>
        <clientCorrelator>67893</clientCorrelator>
    </sms:outboundSMSMessageRequest>
```

In order to make the present disclosure more comprehensible, the present disclosure is described by using a specific application scenario as follows:

An application scenario of the method provided by an embodiment of the present disclosure for converting a SOAP API into a REST API is that telecommunication capabilities are open to Internet applications, for example, a telecommunication carrier opens a short message capability to Internet applications.

An open REST API common message header carries information such as an Internet application provider and an application identifier to a telecommunication capability opening gateway, and the telecommunication capability opening gateway needs to authorize the application provider and application identifier. In the example, the relevant content of the SOAP message header is stored in the "Authorization" field of HTTP. The telecommunication capability opening gateway may obtain HTTP bottom-layer Authorization information to perform authorization, and does not need to parse a service message, thereby improving the processing speed. The specific REST API message is as follows: Authorization is the header field name, EXAMPLEAUTH realm="EXAMPLE" is the header field value, and the underlined part is the extended field which contains the relevant content of the SOAP message header added to the Authorization field in a format of multiple attribute-value pairs.

```
POST
http://www.example.com/sms/1.0/smsmessaging/outbound/100860001/
requests HTTP/1.1
    Accept: application/xml
    Content-Type: application/xml; charset=UTF-8
    Host: example.com:80
    Authorization: EXAMPLEAUTH realm="EXAMPLE",
    devId="3500001",
    authType="01",
    authValue="QWxhZGRpbjpvcGVuIHNlc2FtZQ==",
    timeStamp="0415011502",
    appId="350000100020003",
    SAN="100860001",
    OA="13912345678",
    FA="13912345678",
    multicastMessaging="false",
    <?xml version="1.0" encoding="UTF-8"?>
    <sms:outboundSMSMessageRequest
    xmlns:sms="urn:oma:xml:rest:sms:1">
        <address>tel:+1350000001</address>
        <address>tel:+1350000999</address>
        <senderAddress>tel:+1351111999</senderAddress>
        <senderName >senderName</senderName>
            <receiptRequest>
<notifyURL>http://application.example.com/notifications/
DeliveryInfoNotification</notifyURL>
        </receiptRequest>
        <outboundSMSTextMessage>
            <message> Text Message </message>
        </outboundSMSTextMessage>
        <clientCorrelator>67893</clientCorrelator>
    </sms:outboundSMSMessageRequest>
```

Another application scenario of the method provided by an embodiment of the present disclosure for converting a SOAP API into a REST API is that telecommunication capabilities are open to terminal applications, for example, the telecommunication location capability is open to terminal applications.

When obtaining its own location or the locations of other users, a terminal application needs to carry a common message header to a capability opening gateway for authorization. The common message header may be carried in the Authorization field of the REST API. An example of a message to be delivered is as follows, in which Authorization is the header field name, EXAMPLEAUTH realm="EXAMPLE" is the header field value, and the underlined part is the extended field containing the relevant content of the common message header added to the Authorization field in a format of multiple attribute-value pairs:

```
GET http://www.example.com/ 1.0/terminallocation/13912345678/
location HTTP/1.1
    Accept: application/xml
    Content-Type: application/xml; charset=UTF-8
    Host: example.com:80
    Authorization: EXAMPLEAUTH realm="EXAMPLE",
    username="13912345678",
    authType="01",
    authValue="QWxhZGRpbjpvcGVuIHNlc2FtZQ==",
        timeStamp="0415011502"
        <?xml version="1.0" encoding="UTF-8"?>
        <terminalLocation:terminalLocationRequest
    xmlns:terminalLocation="urn:oma:xml:rest:terminalLocation:1">
            <address>tel:+1350000001</address>
        </terminalLocation:terminalLocationRequest >
```

Figure 2:
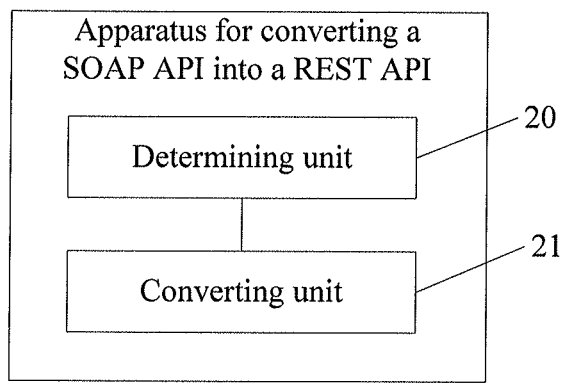
FIG. 2 is a schematic structural diagram of an apparatus for converting a SOAP API into a REST API according to an embodiment of the present disclosure.

An embodiment of the present disclosure provides an apparatus for converting a SOAP API into a REST API, as shown in FIG. 2, including:

a determining unit 20 configured to determine a REST API common message bearing field, where the common message bearing field is a field in a REST API message header and complies with a following format: one header field name+one header field value+multiple attribute-value pairs; and each attribute-value pair includes an attribute name+an attribute value; and a converting unit 21 configured to bear a relevant content of a SOAP message header in the common message bearing field in a format of the attribute-value pairs.

Figure 3:
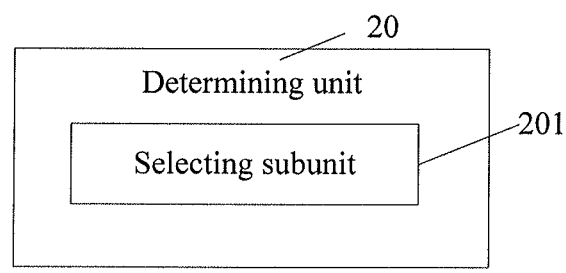
FIG. 3 is a schematic structural diagram of a determining unit in the apparatus for converting a SOAP API into a REST API according to an embodiment of the present disclosure.

As shown in FIG. 3, the determining unit 20 according to an embodiment further includes:

a selecting subunit 201 configured to select the common message bearing field from existing fields of a REST API message header, where the selected field includes an authentication field.

Figure 4:
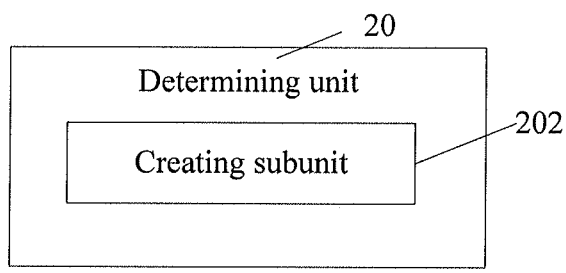
FIG. 4 is a schematic structural diagram of another determining unit in the apparatus for converting a SOAP API into a REST API according to an embodiment of the present disclosure.

As shown in FIG. 4, the determining unit 20 according to another embodiment further includes:

a creating subunit 202 configured to create the common message bearing field in a REST API message header.

Embodiments of the present disclosure provide an apparatus for converting a SOAP API into a REST API. Because the relevant content of a SOAP message header is borne in a REST API common message bearing field, and the common message bearing field is located in a REST API message header, the following problems are prevented: problems such as strong association between a service message and a message header and the necessity of parsing the whole service message body to complete authorization required by the message header during program processing which results in a low processing speed. In addition, because the common message bearing field is a field complying with a format of one header field name+one header field value+multiple attribute-value pairs, a problem of slow bottom-layer negotiation between a client and a server due to too many header field names may be effectively prevented.

Therefore, the apparatus provided by embodiments of the present disclosure for converting a SOAP API into a REST API ensures system simplicity and good protocol parsing performance.

To sum up, according to embodiments of the present disclosure, the relevant content of a SOAP message header is borne in a REST API common message bearing field, and the common message bearing field is located in a REST API message header. Thereby, the following problems are prevented: problems such as strong association between a service message and a message header the necessity of parsing the whole service message body to complete authorization required by the message header during program processing which results in a low processing speed. In addition, because the common message bearing field is a field complying with a format of one header field name+one header field value+ multiple attribute-value pairs, a problem of slow bottom-layer negotiation between a client and a server due to too many header field names may be effectively prevented.

Therefore, the common message header bearer solution provided by embodiments of the present disclosure for converting a SOAP API into a REST API ensures system simplicity and good protocol parsing performance.

Persons of ordinary skill in the art may understand that all or a part of the steps of the method according to embodiments may be implemented by a program instructing relevant hardware. The program may be stored in a computer readable storage medium, and the storage medium may be a read-only memory (ROM for short), a random access memory (RAM for short), a magnetic disk, a CD-ROM, and so on.

The above are only preferred embodiments of the present disclosure. The protection scope of the present disclosure, however, is not limited thereto. Any variation or substitution that is within the scope disclosed by the present disclosure and can be easily conceived for those skilled in the art should be covered in the protection scope of the present disclosure. Hence the protection scope of the present disclosure should be determined by the claims.

What is claimed is:

1. A method for converting a Simple Object Access Protocol Application Programming Interface (SOAP API), into a Representational State Transfer Application Programming Interface (REST API), comprising:

determining a REST API common message bearing field, wherein the REST API common message bearing field is a field in a REST API message header and the REST API common message bearing field comprises: a single header field name, a single header field value, and a plurality of attribute-value pairs; and bearing a relevant content of a SOAP message header in the REST API common message bearing field in a format of the attribute-value pairs.

2. The method according to claim 1, wherein the REST API common message bearing field comprises an authorization field.

3. The method according to claim 1, wherein the REST API common message bearing field comprises a newly created field.

4. The method according to claim 1, wherein the attribute-value pair comprises an attribute name and an attribute value.

5. An apparatus for converting a Simple Object Access Protocol Application Programming Interface (SOAP API) into a Representational State Transfer Application Programming Interface, REST API, comprising a processor and a non-transitory computer readable storage medium accessible to the processor, wherein the non-transitory computer readable storage medium comprising computer program codes which when executed by the processor cause the processor to execute steps comprising:

determining a REST API common message bearing field, wherein the REST API common message bearing field comprises: a single header field name, a single header field value, and a plurality of attribute-value pairs; and bearing a relevant content of a SOAP message header in the REST API common message bearing field in a format of the attribute-value pairs.

6. The apparatus according to claim 5, wherein the processor is further caused to execute a step as follows:

selecting the REST API common message bearing field from existing fields of a REST API protocol message header, wherein the selected field comprises an authorization field.

7. The apparatus according to claim 5, wherein the processor is further caused to execute a step as follows:

creating the REST API common message bearing field in a REST API protocol message header.

8. The apparatus according to claim 7, wherein the attribute-value pair comprises an attribute name and an attribute value.

9. A method for converting a Simple Object Access Protocol Application Programming Interface (SOAP API) into a Representational State Transfer Application Programming Interface (REST API) comprising:

bearing a relevant content of a SOAP message header in a REST API common message bearing field in a format of attribute-value pair, wherein the REST API common message bearing field is a field in a REST API message header and the REST API common message bearing field comprises: a single header field name, a single header field value, and at least one attribute-value pair.

10. The method according to claim 9, wherein the REST API common message bearing field comprises an authorization field.

11. The method according to claim 9, wherein the REST API common message bearing field comprises a newly created field.

12. The method according to claim 9, wherein the attribute-value pair comprises an attribute name and an attribute value.

13. The method according to claim 1, wherein the REST API common message bearing field complies with a format: one header field name+one header field value+multiple attribute-value pairs.

14. The apparatus according to claim 5, wherein the REST API common message bearing field is a field complying with a following format: one header field name+one header field value+multiple attribute-value pairs.

15. The method according to claim 9, wherein the REST API common message bearing field complies with a following format: one header field name+one header field value+at least one attribute-value pair.

* * * * *